United States Patent Office
2,926,169
Patented Feb. 23, 1960

2,926,169

CERTAIN SUBSTITUTED IMIDAZOLIDONES AND IMIDAZOLIDINE THIONES

William B. Hughes, Webster Groves, Mo., assignor to Cities Service Research and Development Company, New York, N.Y., a corporation of New Jersey No Drawing. Application January 2, 1958
Serial No. 706,540

7 Claims. (Cl. 260—309.6)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide new and improved corrosion inhibiting compounds having properties and characteristics which make them uniquely effective in minimizing and reducing corrosion in wells producing oil-brine mixtures, and particularly reducing corrosion in wells in which large amounts of brine are produced as compared to oil.

I have discovered that certain improved compositions prepared by first reacting triethyleneamine with urea or thiourea, and thereafter reacting the product of this reaction with an aldehyde or an acid, results in the production of new and unique compounds having exceptionally effective corrosion inhibiting proporties.

In preparing the new compounds of the present invention, the preparation of the intermediate product is accomplished by reacting equimolar amounts of the triethylene tetramine and urea or thiourea. The resulting product will be an aminoethyl imidazolone or an imidazolthione, depending on whether urea or thiourea is used. This initial action is accomplished by removing one mol of ammonia from the reaction mixture. After recovery of the intermediate product, an equimolar amount of a selected monocarboxylic acid or aldehyde having from about 2 to 18 carbon atoms is reacted with the intermediate product. If the acid is reacted, two mols of water will be removed from the reaction zone, forming on the aminoethyl side chain of the intermediate product an imidazoline ring. If, on the other hand, an aldehyde is reacted with the intermediate product, the resulting ring on the aminoethyl side chain will be a substituted imidazolidine structure.

The general structure of the new compounds of the present invention is as folows:

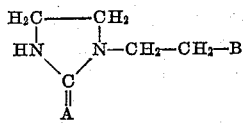

wherein A is selected from the group consisting of O and S, and B is selected from the group consisting of

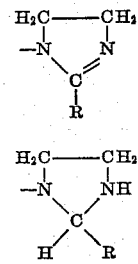

and wherein R is a monovalent hydrocarbon group having from 2 to 18 carbon atoms.

In preparing compounds of the foregoing structure, the intermediate aminoethyl imidazolone or aminoethyl imidazolthione is first prepared in the manner described more specifically in the examples which follow. To obtain the desired final product having the imidazoline or imidazolidine ring on the aminoethyl chain, a selected acid or aldehyde will be used. In preparing imidazolone imidazolines by the utilization of a monocarboxylic acid, any low molecular weight monocarboxylic acid having from 2 to about 20 carbon atoms may be used. In the foregoing structure, R represents the residue of the acid or aldehyde used. Among the acids which have been found suitable for this purpose are: acetic, propionic, butyric, valeric, caproic, heptoic, octanoic, nonoic, lauric, myristic, palmitic, stearic, oleic, linoleic, benzoic, ricinoleic, and terephthalic. On the other hand, to form an imidazolidine ring structure on the aminoethyl side chain of the intermediate imidazolone or imidazolthione compound, a selected aldehyde is used. For this purpose, the following aldehydes have been found suitable: formaldehyde, paraformaldehyde, acetaldehyde, propionaldehyde, butyraldehyde, and heptaldehyde.

In order to more fully understand the nature of the compounds of the present invention, their characteristics, and the manner in which they may be used, the following specific examples are provided. In each example, proof of the basic ring structure has not been reepated. The preparation of the aminoethyl imidazolone utilized as the intermediate reaction product to formulate these new compounds is carried out according to the reaction described by C. E. Sweitzer, Journal of Organic Chemistry 15, 471–474 (1950). In the method described by Sweitzer, equimolar quantities of an aqueous solution of triethylene tetramine are mixed, with the mixture being refluxed so that water and ammonia liberated in the reaction can be removed from the reaction zone. At the end of a four to five hour heating period, substantially all of the water and ammonia have been removed. The temperature of the reaction mass is then increased slowly to about 250° C. to insure complete removal of water and ammonia, with the product thereafter being allowed to cool. The resulting product, a viscous liquid, had a molecular weight as determined by the method of Rast (Ber. 55, 1051, 3727; 1922) of 185. The structure of this material was further confirmed by a qualitative test of Morgan and Burstall, J. Chem. Soc. 1928, 143–55, in which it was shown that compounds with amino groups and a thiocarbonyl or a carbonyl group give complex materials of the type (Cu 2 $tu$) $NO_3 \cdot H_2O$, (Cu 5 $tu$) $NO_3 \cdot 1$ or $2H_2O$, or (Cu 11 $tu$) $NO_3 \cdot 8H_2O$ where $tu$ is the heterocyclic ring compound, when reacted with copper nitrate in acidic media. When a sample of the compounds containing an imidazolone structure is added to a 10% copper nitrate solution which has been acidified with hydrochloric acid, a colorless, gelatinous material forms which is specific for the five membered ring with a double bonded sulfur or oxygen attached.

The preparation of the intermediate imidazolthione compound or specifically aminoethyl imidazolthione is accomplished in the same manner as that described above by substitution of thiourea for normal urea. Reaction conditions remain the same and the product is similar in all respects with the exception of sulfur being substituted for oxygen on the normal imidazolone ring.

In order to more fully and completely understand this invention and more particularly the manner in which the improved compositions thereof are obtained, the following specific examples are provided.

*Example 1*

To an aqueous solution containing 14.6 grams (0.1 mol) of triethylene tetramine, 6.0 grams (0.1 mol) of urea was added. Following the method of Sweitzer, the mixture was allowed to reflux while water was slowly removed and ammonia liberated in the reaction allowed to escape. At the end of a five hour heating period, substantially all of the water and ammonia had been removed and the temperature of the reaction mixture was slowly raised to 250° C. 0.1 mol (18.5 grams) of this product was then reacted with 0.1 mol (11.4 grams) of heptaldehyde. To this mixture, 50 ml. of toluene was added and the mixture refluxed in an apparatus including a water trap condenser to distill the water toluene azeotrope formed by the reaction of the aldehyde and intermediate product. After approximately five hours, 1.8 grams of water had been collected, indicating formation of the imidazolidine ring by conversion of the aldehyde. The azeotrope solvent, toluene, was then removed by distillation to provide a product having a molecular weight of 280. The theoretical molecular weight for this product is 285.

This compound was tested as a corrosion inhibitor, and is identified as inhibitor number 6 in Table I which follows.

*Example 2*

Following the method set forth in Example 1, 0.1 mol of the intermediate aminoethyl imidazolone (18.5 grams) was reacted with 0.1 mol (3 grams) of formaldehyde to produce a final product having a molecular weight of 192. The theoretical molecular weight for this final imidazolone imidazolidine is 196. This product, when tested as a corrosion inhibitor, provided the protection indicated by inhibitor number 5 in Table I which follows.

*Example 3*

Following the procedure of the foregoing examples, 0.1 mol of the intermediate product of Example 1 was reacted with 0.1 mol of benzaldehyde under conditions set forth in Example 1. The product resulting had a molecular weight of 266, as compared to the theoretical value for the product of this reaction which would have a molecular weight of 273.

This compound is identified as inhibitor number 7 in Table I.

*Example 4*

To 20.1 grams (0.1 mol) of imidazolthione prepared by the reaction of triethylene tetramine and thiourea, 11.4 grams (0.1 mol) of heptaldehyde was added. To this mixture 50 ml. of toluene was added and the mixture heated under a water trap condenser to distill the water toluene azeotrope, with toluene being continuously returned to the reaction zone through a decanter stillhead. After six hours, approximately 1.8 grams of water was collected, representing the theoretical quantity which is split out by conversion of the aldehyde to an imidazolidine ring structure. Toluene solvent was then removed by distillation, leaving a viscous oil-soluble product having an average molecular weight of 294. The theoretical molecular weight value for the compound prepared according to this reaction is 299. This product is identified as inhibitor number 1 in Table I.

*Example 5*

Following the procedure set forth in Examples 1 and 4, the intermediate product prepared by the reaction of triethylene tetramine and thiourea was reacted in a 0.1 molar amount with 0.1 mol (7.2 grams) of butyraldehyde. This aldehyde reacted smoothly in three hours to produce a final imidazolthione-imidazolidine product having a molecular weight of 254. This product is identified as inhibitor number 2 in Table I.

*Example 6*

In a manner similar to the foregoing examples, paraformaldehyde (3.0 grams) was reacted with 20.1 grams of the product obtained by the reaction of triethylene tetramine and thiourea as described in Example 4. The product resulting after removal of water from the reaction zone and distillation of excess azeotrope solvent had a molecular weight of 212. This product is identified as inhibitor number 3 in Table I.

*Example 7*

Following the procedure of the foregoing examples, 10.6 grams of benzaldehyde was reacted with 20.1 grams of imidazolthione prepared as indicated in Example 4. The product is a light yellow colored viscous liquid having a molecular weight of about 286. This product is identified as inhibitor number 4 in Table I.

As previously indicated, the intermediate compounds containing either sulfur or oxygen having the aminoethyl side chain may be reacted with a monocarboxylic acid to form an imidazoline ring on the intermediate product. The examples which follow are directed to the preparation of such compounds.

*Example 8*

Using a 0.1 molar quantity of the intermediate aminoethyl imidazolone prepared in Example 1, 0.1 mol of oleic acid is reacted in the presence of xylene to cause condensation of the carboxyl group with the nitrogens of the aminoethyl side chain of the intermediate product of Example 1. Reflux of this mixture was continued in the presence of azeotropic solvent xylene until 0.2 mol of water was removed from the reaction zone. The reaction mass was then heated to a temperature of approximately 280° for a short period of time after removal of the azeotrope to insure completion of the condensation reaction. The resulting product had a molecular weight of 325, and is identified as inhibitor number 1 in Table II which follows.

*Example 9*

Following the procedure set forth in Example 8 above, 6 grams of acetic acid was reacted with the intermediate aminoethyl imidazolone of Example 1 in the method described above to produce a brown oil-dispersible product which was soluble in water and had a molecular weight of 109. This product was tested as an inhibitor, and provided the results shown for inhibitor number 2 in Table II.

*Example 10*

Using the method described above, 10 grams of benzoic acid was reacted with 18.5 grams of the intermediate product of Example 1. The resulting product, a brown oil-soluble material, when tested as a corrosion inhibitor, provided the protection indicated by inhibitor number 3 in Table II.

Example 11

A 0.1 molar quantity of the intermediate product prepared according to Example 4, namely the aminoethyl imidazolthione, was reacted with an equimolar quantity of oleic acid. The product has a molecular weight of 441, and is identified as inhibitor number 4 in Table II.

Example 12

In a manner similar to the foregoing example, acetic acid in a 0.1 molar quantity was reacted with 0.1 mol (20.1 grams) of the product prepared by reacting equimolar amounts of thiourea and triethylene tetramine. The resulting product, a brown, water-soluble, oil-dispersible compound, had a molecular weight of 223. The theoretical molecular weight value for this compound is 229. This compound is identified as inhibitor number 5 in Table II.

The effectiveness of the new compounds of my invention described above, and those which are hereinafter described, in reducing the corrosiveness of oil field brine may be more fully understood by reference to certain tests which I have conducted, using prepared brines to substantially duplicate well conditions. This test hereafter described is generally referred to as the static test since no movement of test strips is made after the test strip has been immersed in the brine. This is to be contrasted with the dynamic test described in my copending application Serial Number 552,264 filed December 12, 1955, wherein the test strip is continuously dipped in the brine over a fixed period of time.

The test procedure used herein involved a measurement of the corrosive action of a hypothetical well fluid as inhibited with compositions described above weighed, cleaned, and polished strips of number 18 gauge cold rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and number one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosive inhibitor being tested was added to each flask in amounts ranging from 10 to 50 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steep strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible, with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measurement of the effectiveness of the inhibitor compositions; thus a protection percent may be calculated for each of the test strips taken from the inhibited test fluids in accordance with the following formula $$\frac{L1 - L2}{L1} \times 100 = \text{percent protection}$$

in which $L1$ is the loss in weight of strips taken from uninhibited test fluids, and $L2$ is the loss in weight of strips which were subjected to inhibited test fluids.

Following the test procedures outlined above, the compounds prepared according to the foregoing examples were tested as corrosion inhibitors. The results of these tests are recorded in Tables I and II which follow. The compounds of Table I are the imidazolone or imidazolthione imidazolidines prepared with the aldehydes previously indicated, whereas the products as reported in Table II are the imidazolone or imidazolthione imidazolines prepared with the acids indicated.

TABLE I

| Inhibitor Number | Percent Protection | | |
|---|---|---|---|
| | 10 p.p.m. | 25 p.p.m. | 50 p.p.m. |
| 1 | 82.7 | 97.7 | 98.2 |
| 2 | 80.6 | 90.8 | 97.1 |
| 3 | 31.4 | 81.4 | 90.2 |
| 4 | 89.9 | 97.3 | 99.0 |
| 5 | 27.9 | 73.8 | 91.3 |
| 6 | 97.3 | 99.9 | 99.8 |
| 7 | 91.4 | 97.7 | 98.9 |

TABLE II

| Inhibitor Number | Percent Protection | | |
|---|---|---|---|
| | 10 p.p.m. | 25 p.p.m. | 50 p.p.m. |
| 1 | 89.9 | 98.6 | 99.9 |
| 2 | 21.8 | 49.7 | 86.1 |
| 3 | 86.7 | 94.6 | 98.2 |
| 4 | 89.9 | 97.3 | 98.8 |
| 5 | 23.6 | 56.4 | 88.1 |
| 6 | 89.1 | 96.4 | 99.1 |

It will be evident from the foregoing tables that the new compounds of my invention provide a substantial amount of protection against corrosive fluids normally passing through well tubing and associated gathering equipment. It will be noted that the effectiveness of compounds prepared with low molecular weight aldehydes such as formaldehyde, and acids such as acetic acid are not as effective as the higher molecular weight aldehydes and acids. However, even with the latter, when used in a somewhat greater amount such as, for example, 50 p.p.m., satisfactory protection against corrosion is obtained.

While the tests were conducted with amounts of inhibitor varying from 10 to 50 p.p.m., more or less inhibitor may be used in field operations, depending on the corrosivity of the fluid present. In field use, the concentration of the inhibitor will vary in accordance with the particular conditions found. As has been experienced over periods of time, the corrosivity of a particular well may vary widely, thus necessitating changes in the amount of inhibitor added. The inhibitors of the present invention will normally be used in amounts of from 10 to 1500 p.p.m., and generally not more than about 1000 p.p.m. Their use, of course, at the present time is somewhat limited by their cost. It would be desirable to use substantial quantities of inhibitor in view of the high losses due to corrosion, but the comparatively high cost of compounds of this type limits the amount which can be economically added for protection purposes.

In utilizing these new compounds, it has been found that excellent results are obtained by dissolving them in an appropriate amount of water or other inert solvent such as kerosene or the like. The use of such a solvent permits easy handling and is a convenient means for injecting inhibitor into the well or transfer lines. When utilized in pipe lines, the gas or oil flowing through the lines is effective to mix the inhibitor with the corrosive fluid present, sweeping the same through the system and thereby providing protection for the metal equipment with which it comes in contact after the point of injection.

It is to be understood that the improved compositions of my invention are not limited to use alone, and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. As a new composition of matter, a compound having the formula

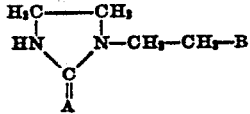

wherein A is selected from the group consisting of O and S, and B is selected from the group consisting of

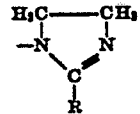

and

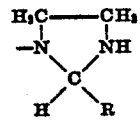

wherein R is a member of the group consisting of alkyl radicals having from 1 to 17 carbon atoms, the non-carboxy residue of oleic, linoleic, ricinoleic acids and phenyl.

2. As a new composition of matter, a compound having the formula

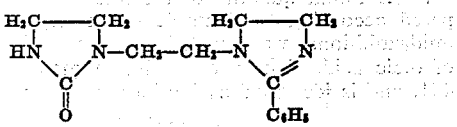

3. As a new composition of matter, a compound having the formula

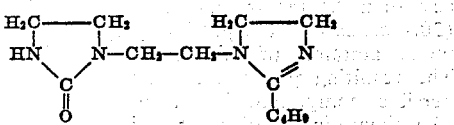

4. As a new composition of matter, a compound having the formula

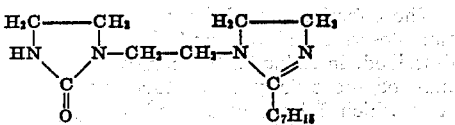

5. As a new composition of matter, a compound having the formula

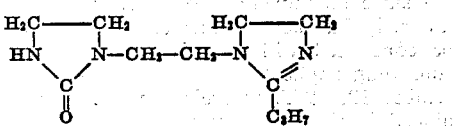

6. As a new composition of matter, a compound having the formula

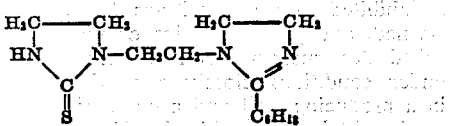

7. As a new composition of matter, a compound having the formula

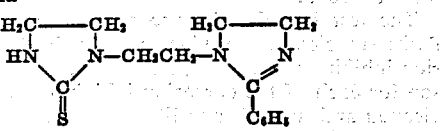

References Cited in the file of this patent

UNITED STATES PATENTS 2,483,969    Gajewski  ---------------- Oct. 4, 1949
2,643,978    Hughes  ------------------ June 30, 1953

OTHER REFERENCES

McKay et al.: Chem. Abstracts, vol. 47, col. 2720 (1953).